United States Patent Office 3,813,402
Patented May 28, 1974

3,813,402
BLUE ANTHRAQUINONE ACID DYES
James F. Feeman, Wyomissing, Pa., assignor to Compton
& Knowles Corporation, Worcester, Mass.
No Drawing. Filed Oct. 20, 1971, Ser. No. 190,816
Int. Cl. C09b 1/34
U.S. Cl. 260—372                         2 Claims

ABSTRACT OF THE DISCLOSURE

Compounds, useful in the dyeing of polyamides, having the formula:

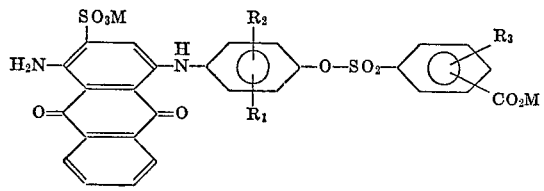

wherein M represents —H, —Na, —K, —Li or $NH_4$; $R_1$ and $R_2$ are —H or —lower alkyl; $R_3$ is —H, —lower alkyl, —F, —Cl, Br or $NO_2$.

---

This invention relates to new compounds that are useful in the dyeing of polyamides such as nylon, silk and wool and that are particularly useful for the dyeing of the deeper dyeing nylon components of differential-dyeing nylon textiles.

The new compounds have the structure

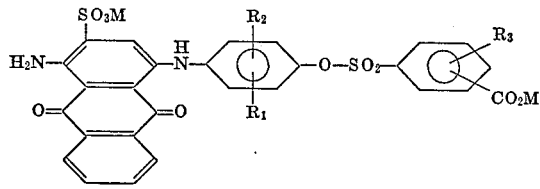

wherein

M represents —H, —Na, —K, —Li or $NH_4$;
$R_1$ represents —H or —lower alkyl;
$R_2$ represents —H or —lower alkyl;
$R_3$ represents —H, —lower alkyl, —F, —Cl, Br or $NO_2$.

The new compounds are made by condensing 1-amino-4-bromoanthraquinone-2-sulfonic acid (Bromamine acid) under mildly alkaline conditions in the presence of a copper catalyst with 4-amino-phenol, a 4-amino-alkyl-phenol, or a 4-amino-dialkyl-phenol and reacting the thus formed intermediate with a chlorosulfonyl-benzoic acid or an alkyl, nitro or halo derivative thereof, also under mildly alkaline conditions.

The dyes are usually formed as the sodium salts of the sulfonic and carboxylic acids. They can be used as such or converted to the free acids by treatment with an inorganic acid in the cold and filtering. These can be converted to various salts such as the —Na, —K, —Li or —$NH_4$ salt by neutralization with a suitable hydroxide, carbonate or bicarbonate.

Suitable aminophenols which can be used for reaction with Bromamine acid to produce the intermediate having the Structure I

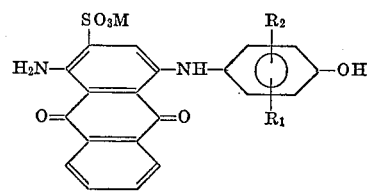

(Structure I)

include para-aminophenol,
2-methyl-4-aminophenol,
3-methyl-4-aminophenol,
2-ethyl-4-aminophenol,
3-ethyl-4-aminophenol,
2,3-dimethyl-4-aminophenol,
3,5-dimethyl-4-aminophenol,
2,5-dimethyl-4-aminophenol,
and the like.

Suitable chlorosulfonyl-benzoic acids which can be used for reaction with Structure I intermediates to produce the new dyes include 3-chlorosulfonyl-benzoic acid,
4-chlorosulfonyl-benzoic acid,
2,4,5 or 6-methyl-3-chlorosulfonyl-benzoic acid,
2,4,5 or 6-chloro-3-chlorosulfonyl-benzoic acid,
4-bromo-3-chlorosulfonyl-benzoic acid,
5-nitro-3-chlorosulfonyl-benzoic acid,
4-fluoro-3-chlorosulfonyl-benzoic acid,
2-fluoro-5-chlorosulfonyl-benzoic acid;
2-chloro-4-chlorosulfonyl-benzoic acid,
3-chloro-4-chlorosulfonyl-benzoic acid,
2 or 3-methyl-4-chlorosulfonyl-benzoic acid,
and the like.

The new compounds are useful as light-fast blue dyes for polyamides. When applied to yarns or textile fabrics composed of polyamides that have differing dyeing characteristics, for example composite nylon yarns or textiles composed of two or more different types of nylon fibers that have differing dyeing characteristics e.g. regular nylon, deep dyeing nylon, ultra-deep dyeing nylon, light-dyeing nylon and cationic-dyeable nylon, the dyes can be used to produce striking color contrasts between the different fiber types of a given composite by controlling the pH at which the dye is applied. In addition the dyes of this invention may be applied simultaneously with dyes or other types such as disperse, modified basic, or neutral dyeing acid dyes to give still other contrast variants. Generally, the dyes of this invention dye the deeper-dyeing nylons well at all usual pH values, e.g. from pH 2–11; however, at pH values above about 7 they do not dye regular, light-dyeing or cationic dyeable nylon appreciably, and at pH 9+ do not dye these components at all.

When the compounds of this invention are applied to a composite nylon yarn or textile containing nylon 6 fibers and nylon 6,6 fibers, good differential dyeing is obtained between the nylon 6 and nylon 6,6 fibers, different depths of blue color being obtained. The ratio of depth of shade between the two types of nylon and the exhaustion of the dyebath is dependent upon the pH value of the dyebath. In general, degree of exhaustion will decrease with increase of pH and regular or light dyeing nylon 6,6 will be dyed in lighter shades or even be undyed while the more receptive components will be deeply colored thus producing contrast.

The new compounds are compatible with a wide variety of other dyes for polyamides when applied from a common bath, and in general they are not readily blocked by other dyes.

The following example will serve to illustrate the preparation and use of the dyes of this invention. In this example, parts and percentages are by weight and temperatures and in degrees centigrade, unless otherwise stated.

EXAMPLE 1

The compound (43 parts) having the structure:

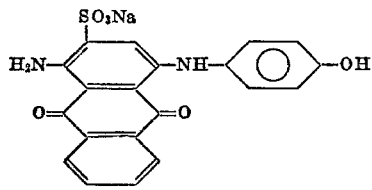

(prepared by condensing 1-amino-4-bromoanthraquinone-2-sulfonic acid, sodium salt, with *para*-aminophenol in alkaline solution in the presence of $CuCO_3$ as catalyst) was dissolved at pH 9.4 in 500 parts of water at 75°. To this solution was added 30 parts of sodium carbonate. During the next half hour 35 parts of 3-chlorosulfonyl-benzoic acid was added in small portions at the end of which the original greenish-blue solution had changed to reddish-blue. To the solution was added 90 parts of sodium chloride. Upon cooling to 45° the product crystallized from solution and was filtered and dried.

It is a dark blue, highly water-soluble solid which dyes nylon and other natural and synthetic polyamide fibers from aqueous acidic baths in reddish-blue shades having good fastness to light and washing and has the structure:

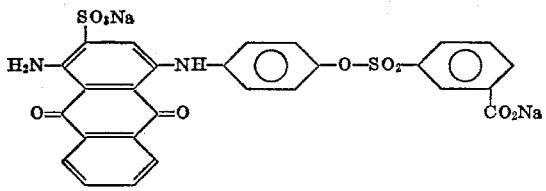

It dyes deep-dyeing and ultra deep-dyeing nylon fibers and fabrics from neutral to alkaline baths while leaving regular nylon 6,6 undyed or only slightly tinted in the same bath.

The disodium salt (25 parts) was pasted into 250 parts of water giving complete solution at 25°. Addition of 10 parts of concentrated hydrochloric acid lowered the pH to less than 1 and gave complete precipitation of the dye as the free acid. The precipitate was filtered and washed with 100 parts of water containing 5 parts of concentrated hydrochloric acid. The resultant paste was slurried in 100 parts of water. Addition of 8 parts of concentrated ammonium hydroxide gave a solution of the dye as the diammonium salt at pH 10.

In the above procedure when the slurry of acid paste was treated with 5 parts of potassium carbonate, a solution of the dipotassium salt of the dye resulted. Similarly, substitution of 5 parts of lithium carbonate for the potassium carbonate gave a solution of the dilithium salt of the dye. These salts were obtained as dry water-soluble powders by spray drying. They have similar dyeing and fastness properties to those of the disodium salts when applied to nylon fibers and fabrics.

Dyes having a generally similar structure but which do not include a water-solubilizing group such as a carboxy group in the terminal benzene ring do not have the dyeing characteristics of the dyes of this invention, in that they dye regular nylon from neutral to alkaline solutions whereas the dyes of this invention are not satisfactory dyes under such conditions.

I claim:
1. A compound having the structure:

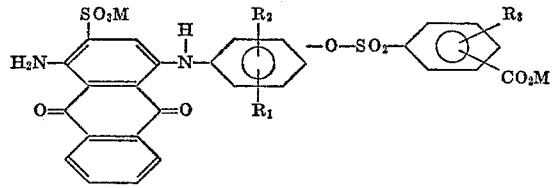

wherein M represents —H, —Na, —K, —Li or —$NH_4$; $R_1$ represents —H or —lower alkyl; $R_2$ represents —H or —lower alkyl; $R_3$ represents —H, —lower alkyl, —F, —Cl, Br or $NO_2$.

2. A compound according to claim 1 having the structure:

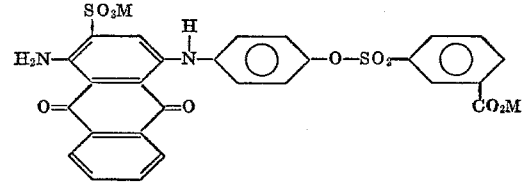

References Cited
UNITED STATES PATENTS 2,213,188  9/1940  Fleischhauer _____ 260—372

LORRAINE A. WEINBERGER, Primary Examiner

E. J. SKELLY, Assistant Examiner

U.S. Cl. X.R.

8—21 B, 39

UNITED STATES PATENT OFFICE
CERTIFICATE OF CORRECTION

Patent No. 3,813,402    Dated May 28, 1974

Inventor(s) James F. Feeman

It is certified that error appears in the above-identified patent and that said Letters Patent are hereby corrected as shown below:

Column 2, Line 53 - "or" should read --of--

Column 4 - the Structure in Claim 1 appearing between lines 26 and 35 should appear as:

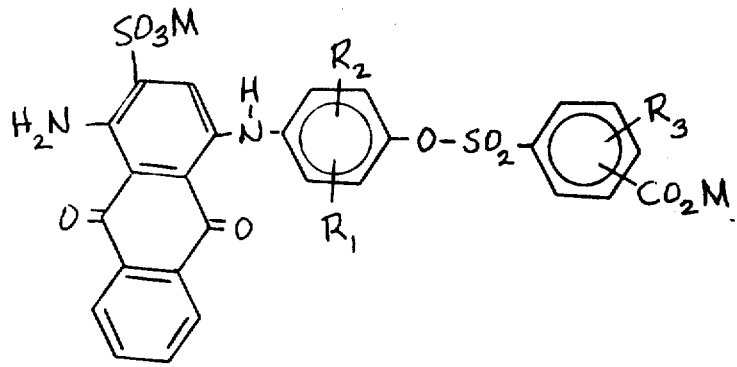

Signed and sealed this 15th day of April 1975.

(SEAL)
Attest:

RUTH C. MASON
Attesting Officer

C. MARSHALL DANN
Commissioner of Patents
and Trademarks